(No Model.)
W. J. C. ROWE.
EXTENSION JAW FOR CHUCKS.
No. 456,854. Patented July 28, 1891.
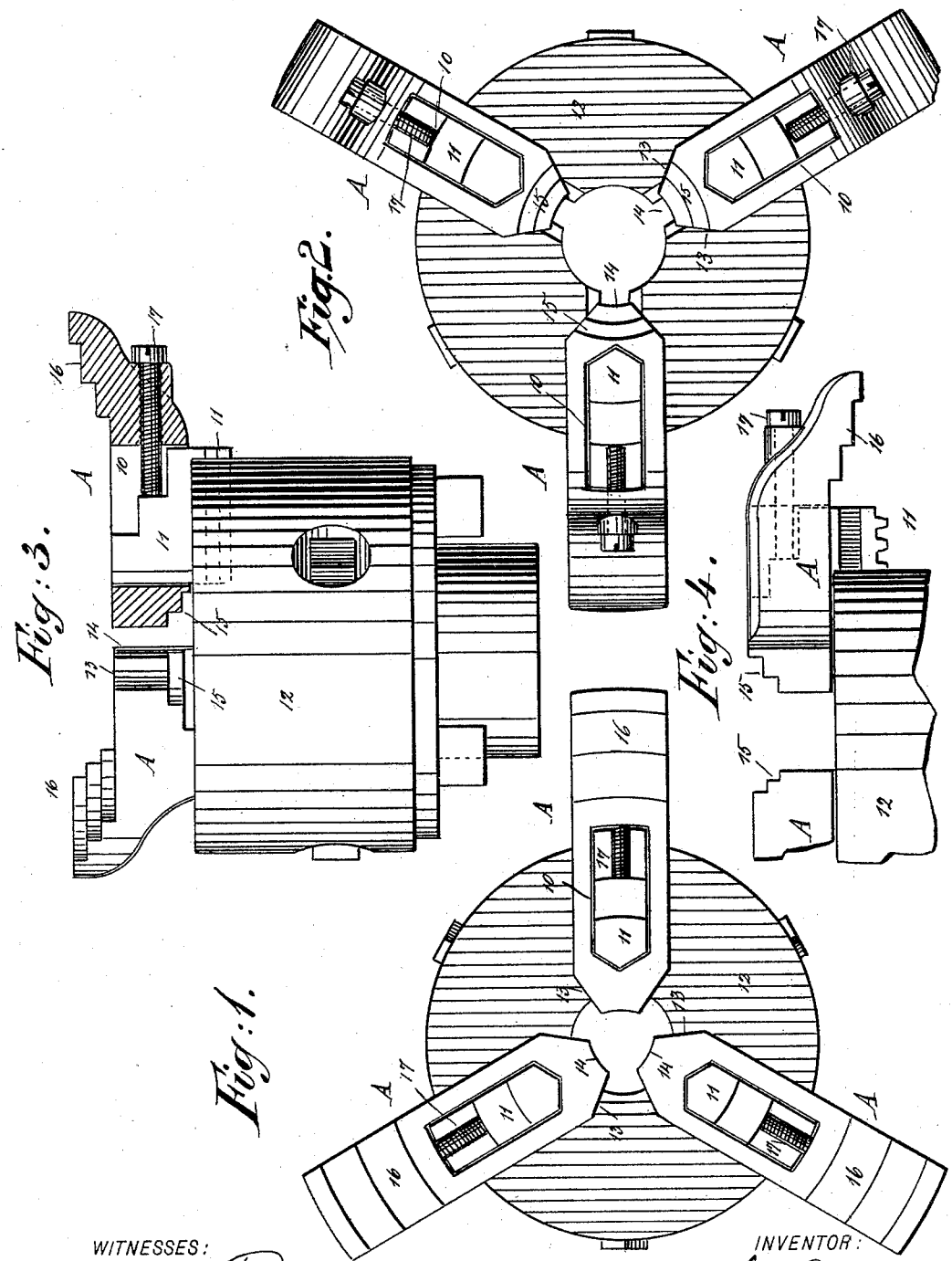

UNITED STATES PATENT OFFICE.

WILLIAM J. C. ROWE, OF NEW YORK, N. Y.

EXTENSION-JAW FOR CHUCKS.

SPECIFICATION forming part of Letters Patent No. 456,854, dated July 28, 1891.

Application filed December 16, 1890. Serial No. 374,873. (No model.)

*To all whom it may concern:*

Be it known that I, WILLIAM J. C. ROWE, of New York city, in the county and State of New York, have invented new and Improved Extension-Jaws for Chucks, of which the following is a full, clear, and exact description.

My invention relates to extension-jaws for chucks, and has for its object to construct a simple, economic, and durable device, stepped to receive articles of different diameters and capable of being readily attached to the jaws of any chuck to increase the capacity thereof.

A further object of the invention is to provide reversible auxiliary jaws, which when turned upon one face will receive large objects and when placed upon the opposite face will clamp small articles.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of a chuck with the auxiliary jaws attached, the jaws being shown in position to receive articles of much greater diameter than could be accommodated by the jaws constituting a part of the chuck. Fig. 2 is a similar view, the auxiliary jaws, however, being illustrated as reversed and in position to receive small articles. Fig. 3 is a side elevation of the chuck, one of the auxiliary jaws being in vertical section with the upper face uppermost; and Fig. 4 is a partial side view of a chuck, the auxiliary jaws having their under faces uppermost.

The auxiliary jaws are adapted to constitute extensions of the ordinary chuck-jaws, and are of like construction, each consisting of a block A, which may be a casting or a forging provided with a central longitudinal opening 10, shaped to receive and neatly fit to the contour of the chuck-jaws 11, forming a portion of the ordinary chuck 12. The inner end of the auxiliary jaw is provided with beveled surfaces 13 at its corners, the bevel being in direction of its center, and the central surface 14 of said end is slightly concaved or formed upon the arc of a circle. The slotted portions of the jaw are preferably flat and smooth and are adapted to fit closely to the face of the chuck. In one face of the jaw, at its inner end, two or more curved steps 15 are produced, the said steps being below the horizontal plane of the face, and the latter at its outer end, is more or less curved or beveled in direction of the opposite face. The outer end of the face of the jaw, the reverse of that in which the steps 15 are made, is higher than the slotted portion, being elevated sufficiently to have one or more curved steps 16 produced therein, as is best shown in Fig. 3. When placing the auxiliary jaws in position, either the upper or the lower face is placed in close contact with the face of the chuck carrying the jaws and with the said jaws 11 of the chuck neatly fitting the openings 10 in the auxiliary jaws. As one end wall of each auxiliary jaw is angular to correspond to the angular inner surface of a chuck-jaw 11 and one jaw fits neatly in the other, a very simple fastening device may be employed to retain the jaws in engagement, and the said device preferably consists of a screw 17, passed longitudinally through the beveled or grooved end of a jaw into its opening 10, the screw being so located that when the auxiliary jaw is placed in position upon the chuck-jaw its set-screw when tightened up will preferably engage with the central portion of the central step of the chuck-jaw, as shown in Fig. 3. It is evident that the auxiliary jaws may be reversed, and that exceedingly large or small objects may be held thereby.

Having thus described my invention, I claim as new and desire to secure by Letters Patent—

1. An auxiliary jaw for chucks adapted as an extension of the main jaw of a chuck, consisting of a block provided with a longitudinal opening adapted to receive the chuck-jaw and having a series of steps produced at one end raised above the slotted face of the block, the under end surface of the block at which point the steps are located being curved downward, and a set-screw passed through a threaded aperture in the curved end surface of the block into its longitudinal opening, the said set-screw being adapted for engagement with the main jaw of the chuck, said screw being also concealed and removed from all possible engagement with the work carried by the extension-jaws, as and for the purpose specified.

2. An auxiliary jaw adapted as an extension for the main jaw of a chuck, consisting of a block provided with a longitudinal slot extending through from face to face and adapted to receive the main jaw of a chuck, steps produced upon one face of the block at the outer end thereof, the said steps being elevated above the slotted surface of the face and steps produced in the opposite face at the opposite end of the block, the latter steps being lower than the plane of the face, and a set-screw located in the block and extending into the opening thereof, said set-screw being adapted to engage with the main jaw of the chuck, as and for the purpose set forth.

WILLIAM J. C. ROWE.

Witnesses:
J. FRED. ACKER,
LUDWIG P. SUESS.